March 24, 1964  R. STAEGER  3,126,196

STIRRER FOR HOUSEHOLD APPLIANCE

Filed April 4, 1961  2 Sheets-Sheet 1

March 24, 1964 R. STAEGER 3,126,196
STIRRER FOR HOUSEHOLD APPLIANCE
Filed April 4, 1961 2 Sheets-Sheet 2
FIG. 2
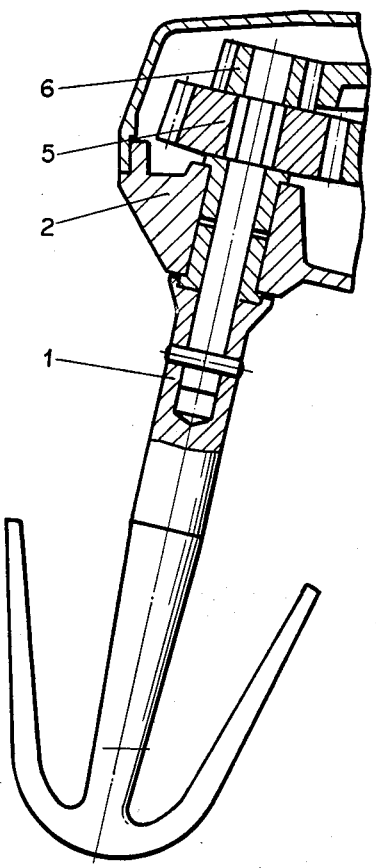
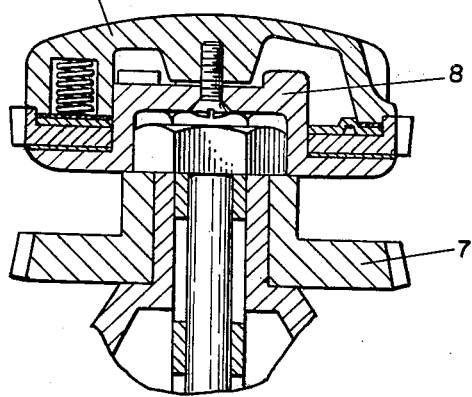
FIG. 3

United States Patent Office 3,126,196
Patented Mar. 24, 1964

---

3,126,196
STIRRER FOR HOUSEHOLD APPLIANCE
Rudolf Staeger, Alsterdorferstrasse 155,
Hamburg 39, Germany
Filed Apr. 4, 1961, Ser. No. 100,713
Claims priority, application Germany June 15, 1960
7 Claims. (Cl. 259—102)

This invention relates to a stirring and kneading device for small appliances, particularly for household use.

Known stirrers and kneaders, particularly of the kind used in kitchen appliances, are fitted with stirring elements which are driven by a motor through gearing with a fixed transmission ratio. Since the stirring devices are contemplated for use with material of different consistencies, they must be operative throughout a range of speeds. Thus, the devices are provided with motors and conventionally the speed of the stirring elements is controlled by regulating the speed of the motor. However, this has numerous disadvantages. The speed is adjusted for the purpose required by the person who employs the appliance. Faulty adjustment may cause the stirrers to be damaged. Another drawback is the reduction in the torque of the motor in the lower speed ranges, whereas the torque requirement is generally highest thereat. Moreover, additional expense is involved in the provision of accessory structural parts. Also there is the risk of additional damage.

Known stirrers are driven either by a central shaft or by a cross shaft associated with several stirrers which are driven by the cross shaft either through gears or by frictional contact. The speed of the stirrer or stirrers then depends upon the speed of the shaft. When working stiff doughs a high speed can cause considerable trouble because the constant speed of the kneading arm in the course of the kneading process may give rise to vibratory effects due to imbalance. Moreover, since the kneading arms must extend to the wall of the container to ensure a thorough working of the dough, their rotation requires a considerable driving effort.

The present invention offers a novel and simple way of working not only a stiff dough but also of whipping liquid materials, such as cream, whites of egg and so forth. The problem which is solved is that of eliminating the unfavorable effect on the stability of the container due to imbalance force arising as a result of the effort needed for stirring a very stiff dough and at the same time of providing a simple method of speed control to generate the different speeds required for stirring and whipping materials of different consistencies.

According to the invention the device comprises one or more stirrers of suitable material mounted on a cross member in a stirring or kneading vessel, and is characterized by a cross member mounted on a central shaft which carries two coaxial gear wheels of which one— the upper wheel—is loose and can rotate on the shaft during rotation. These two gear wheels are in mesh with two smaller corresponding gear wheels on each of the stirrer shafts and the loose gear wheel is controllably braked by friction means.

In order to permit the nature and manner of operation of the proposed stirring device to be more readily understood reference will now be made to the accompanying drawings which illustrate an embodiment of the invention.

FIGURE 2 is a similar section of one of the stirrers with the two smaller gear wheels and part of the central gear wheels, shown on a larger scale, and FIGURE 3 is an axial section of the friction brake and the cooperating loose gear wheel on the central shaft.

Figure 1:
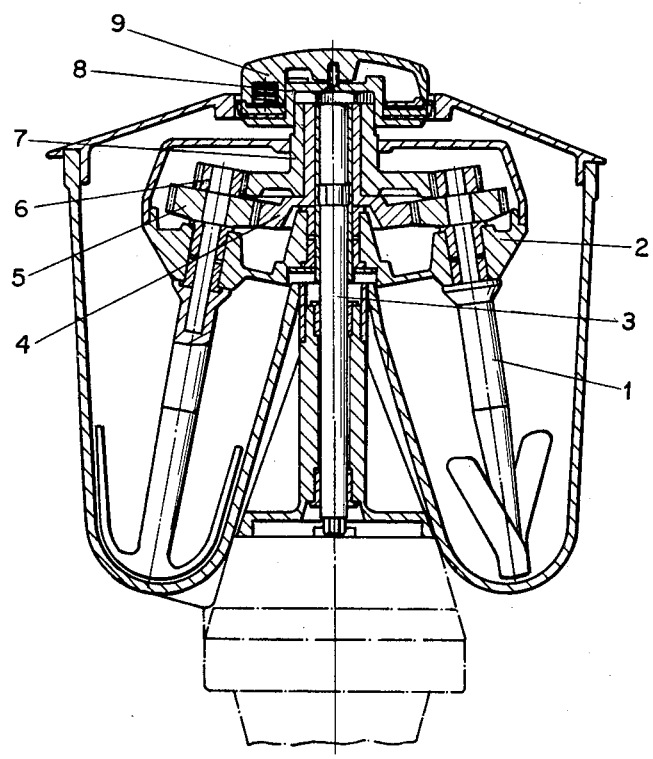
FIGURE 1 is an axial elevational section of a kneading and stirring device according to the invention.

As will be seen by reference to these drawings, the stirrers, generally two in number, are rotatably mounted on opposite sides of a cross member 2 which is itself rotatably mounted on a central shaft 3. The rotary motion of the central shaft is transmitted by gearing, that is to say through a gear wheel 4 which is rigid with said central shaft, and which meshes with cooperating gear wheels 5 on the shafts of the stirrers 1. Moreover, the shaft of each stirrer carries rigid therewith a further smaller diameter gear wheel 6, these smaller gear wheels engaging a second central gear wheel 7 which is loosely supported on the control shaft. Above this latter gear wheel is a brake 8, preferably in the form of a friction brake which is frictionally or rigidly coupled with the loose gear wheel, and which prevents overloading during operation. In other words, the friction brake has the effect of braking the loose gear wheel on the central shaft. The brake is adjusted in conformity with the strength of the material and the purpose envisaged for the stirrer. Conveniently the blades of the stirrers are thin edged and angularly set in such manner that the stirred material will offer greater resistance to rotation of the stirrers about the central shaft and less resistance to rotation of the stirrers about their own axes.

The stirring and kneading appliance according to the invention offers decisive advantages over known appliances of this kind because, despite great simplicity of construction, it permits an automatic regulation of the stirring or whipping speed in accordance with the nature of materials of different specific consistency, and it thereby suppresses the undesirable effects which are due to the rotation of out-of-balance masses as well as any possible overloading of the appliance. As soon as the appliance is started and the loose gear wheel is braked by the suitably adjusted friction brake, the rotation of the central shaft will drive the small gear wheels around the braked gear wheel causing the cross member with the stirrers to counter-rotate. A very high speed of rotation may thereby be imparted to the stirrers and they are thus capable of whipping fluid material such as cream, whites of egg, and the like. On the other hand, should they encounter major resistance, for instance when stirring stiff pastes, this acts in opposition to the braking effect on the loose gear wheel and thereby offsets the same. The resistance of the pastes may be sufficient to completely offset the braking action, so that the counter-rotation of the cross member may be reduced to a zero value. The cross member will then simply rotate at the speed of the central shaft. The described effect even permits a stiff dough to be satisfactorily stirred without incurring the disadvantages inherent in known kneading and stirring appliances. The top of the friction brake is sealed by a cap 9 or the like which simultaneously positions the brake and ensures that the kneading and stirring action can be cleanly performed.

I claim:

1. A device adapted for stirring materials of different consistencies, the device comprising a vessel, a drive shaft in said vessel adapted for being driven in rotation, a cross member mounted around said drive shaft, a stirrer including a shaft rotatably supported in said cross member, a pair of gears rigidly supported on said shaft of said stirrer in coaxial arrangement, a drive gear rigid with said drive shaft and in meshing engagement with one of the gears on the shaft of the stirrer for driving said one gear and the stirrer therewith, a further gear loosely supported on said drive shaft and in meshing engagement with the other of the gears on the shaft of the stirrer and braking means operatively associated with the further gear for exerting a force thereon to control rotation thereof and thereby control rotation of said stirrer.

2. A stirring device as claimed in claim 1 wherein the gears on the shaft of the stirrer are smaller in diameter than the corresponding gears with which they mesh.

3. A stirring device as claimed in claim 1 wherein said drive gear and further gear are coaxially supported on said drive shaft, and wherein said braking means comprises a friction brake coaxially supported with respect to said drive shaft and movable towards and away from said further gear for engaging the latter in an adjustable manner.

4. A stirring device as claimed in claim 1 wherein said drive gear and further gear are coaxially supported on said drive shaft, and wherein said braking means comprises a friction brake coaxially supported with respect to said drive shaft and in frictional engagement with said further gear.

5. A stirring device as claimed in claim 4 comprising a cap operatively coupled to the cross member and enclosing the friction brake.

6. A stirring device as claimed in claim 1 wherein said stirrer includes blades having at least one sharp edge.

7. A device adapted for stirring materials of different consistencies, the device comprising a vessel, a drive shaft in said vessel adapted for being driven in rotation, a cross member rotatably mounted around said drive shaft, a stirrer including a shaft rotatably supported in said cross member and adapted for moving along a concentric path around the drive shaft, a pair of rigid gears coaxially supported in rigid fashion on said shaft of said stirrer, a drive gear rigid with said drive shaft and in meshing engagement with one of the gears on the shaft of the stirrer for driving the latter and the stirrer therewith, a further gear loosely supported relative to said drive shaft in coaxial relation therewith and in meshing engagement with the other of the gears on the shaft of the stirrer, and a friction brake coupled to the vessel and adapted for engaging the further gear to exert a force thereon to control rotation thereof and thereby control rotation of the stirrer, the friction brake being effective to permit slippage with the further gear when excessive force is exerted on the stirrer by material being stirred.

References Cited in the file of this patent
UNITED STATES PATENTS
2,003,829    Gilbert et al. _____ June 4, 1935